(12) United States Patent
Yasuda et al.

(10) Patent No.: US 12,239,116 B2
(45) Date of Patent: Mar. 4, 2025

(54) BRAKING DEVICE AND FISHING REEL COMPRISING THE SAME

(71) Applicant: GLOBERIDE, Inc., Tokyo (JP)

(72) Inventors: Hiromu Yasuda, Tokyo (JP); Motohiro Nonogaki, Tokyo (JP)

(73) Assignee: GLOBERIDE, INC, Tokyo (JP)

( * ) Notice: Subject to any disclaimer, the term of this patent is extended or adjusted under 35 U.S.C. 154(b) by 125 days.

(21) Appl. No.: 17/980,708

(22) Filed: Nov. 4, 2022

(65) Prior Publication Data

US 2023/0133137 A1 May 4, 2023

(30) Foreign Application Priority Data

Nov. 4, 2021 (JP) .................................. 2021-180325

(51) Int. Cl.
| | | |
|---|---|---|
| *A01K 89/01* | (2006.01) | |
| *A01K 89/033* | (2006.01) | |
| *G01D 5/24* | (2006.01) | |
| *G01D 5/30* | (2006.01) | |
| *G01D 5/34* | (2006.01) | |

(52) U.S. Cl.
CPC ......... *A01K 89/033* (2013.01); *G01D 5/2405* (2013.01); *G01D 5/30* (2013.01); *G01D 5/342* (2013.01)

(58) Field of Classification Search
CPC .......... A01K 89/0155; A01K 89/01555; A01K 89/015

See application file for complete search history.

(56) References Cited

U.S. PATENT DOCUMENTS

| | | | |
|---|---|---|---|
| 4,710,689 A | 12/1987 | Uetsuki et al. | |
| 6,045,076 A | * 4/2000 | Daniels ............ | A01K 89/01555 |
| | | | 242/287 |
| 2004/0140163 A1 | 7/2004 | Ikuta et al. | |
| 2004/0148843 A1 | 8/2004 | Ikuta et al. | |
| 2004/0227029 A1 | 11/2004 | Ikuta et al. | |
| 2017/0172130 A1 | 6/2017 | Komemushi et al. | |
| 2017/0208789 A1* | 7/2017 | Numata ............... | A01K 89/017 |
| 2019/0223421 A1 | 7/2019 | Niitsuma | |
| 2019/0335734 A1 | 11/2019 | Kitano et al. | |

(Continued)

FOREIGN PATENT DOCUMENTS

| | | | |
|---|---|---|---|
| CN | 105309400 B | * 10/2020 | ........... A01K 89/015 |
| CN | 115707380 A | 2/2023 | |
| JP | 57040786 Y | 9/1982 | |

(Continued)

OTHER PUBLICATIONS

Office Action for related Taiwanese Application No. 111140005; action dated May 24, 2023; (8 pages).

(Continued)

*Primary Examiner* — Emmanuel M Marcelo
(74) *Attorney, Agent, or Firm* — Oliff PLC

(57) ABSTRACT

A braking device of a fishing reel comprises: a braked part made of a conductor, the braked part being attached to a spool designed to wind a fishing line; a braking part generating braking force by providing a magnetic field for the braked part; a part being detected that is provided on the braked part, and a rotation detection sensor sensing rotation of the spool by detecting the part being detected.

6 Claims, 4 Drawing Sheets

(56) References Cited

U.S. PATENT DOCUMENTS

2023/0055291 A1    2/2023   Yasuda
2024/0090484 A1    3/2024   Yasuda

FOREIGN PATENT DOCUMENTS

| | | |
|---|---|---|
| JP | S62-001575 U | 1/1987 |
| JP | 10310867 Y2 | 3/1991 |
| JP | 108228647 A | 9/1996 |
| JP | H1042758 A | 2/1998 |
| JP | 2003-219774 A | 8/2003 |
| JP | 2004208631 A | 7/2004 |
| JP | 2004208632 A | 7/2004 |
| JP | 2004208633 A | 7/2004 |
| JP | 2004357601 A | 12/2004 |
| JP | 2017108704 A | 6/2017 |
| TW | 201722274 A | 7/2017 |
| TW | 201932008 A | 8/2019 |
| TW | 201946531 A | 12/2019 |

OTHER PUBLICATIONS

Jun. 20, 2024 Office Action issued in Chinese Patent Application No. 202211368344.9.
Nov. 29, 2024 Office Action issued in Chinese Patent Application No. 20221136834.9.
Dec. 24, 2024 Office Action issued in Japanese Patent Application No. 20221-180325.
Dec. 30, 2024 Office Action issued in Korean Patent Application No. 10-2022-0143466.

* cited by examiner

BRAKING DEVICE AND FISHING REEL COMPRISING THE SAME

CROSS-REFERENCE TO RELATED APPLICATIONS

This application claims priority under 35 U.S.C. § 119 to Japanese Patent Application No. 2021-180325 filed on Nov. 4, 2021 in the Japanese Patent Office, the entire contents of each hereby incorporated by reference.

FIELD

The present disclosure relates to braking devices, particularly a double bearing reel braking device used to control a brake on a spool mounted rotatably to a main reel body, and relates to a fishing reel comprising such a braking device.

BACKGROUND

Conventional double bearing reels, particularly bait casting reels used to cast a fishing device such as a lure attached to a tip of a fishing line, are provided with braking devices for controlling brakes on spools to prevent a backlash in casting. Some braking devices of this type, as in Japanese Examined Utility Model Application Publication No. H03-010867, are designed to electrically adjust braking force and are thereby able to adjust braking force during casting of a lure or something similar.

Japanese Examined Utility Model Application Publication No. H03-010867 discloses, as such a double bearing fishing real, a fishing reel that includes: a sensor to detect rotation of a spool: a counter circuit to count pulses of a signal sent from the sensor by a pulse counter whenever a reference clock circuit generates a signal; and control means to compute a rotation speed and a rotational acceleration of the spool through an arithmetic circuit based on a value of the counted pulses and generate an eddy current in a non-magnetic conductor when the value of the counted pulses reaches a value set by a data setter in advance.

SUMMARY

In Japanese Examined Utility Model Application Publication No. H03-010867, the spool is provided with a rotation detection sensor to acquire a status of the spool during casting, such as a number of revolutions, and rotation speed and a rotational movement amount are detected by converting a movement of means to be detected, such as a magnet or a reflector provided on the spool, into an electric signal by detection means such as a magnetic sensor or a photosensor. Thus, the spool needs to be provided with the means to be detected, separately in addition to a member used to generate braking force, and this disadvantageously causes an increase in overall apparatus size and cost, as well as an increase in inertia of the spool.

In view of the above background, it is an object of the present disclosure to provide a braking device that integrates a member used to generate braking force with means to be detected that is used to detect rotation of the spool and provide a fishing reel comprising such a braking device to avoid an increase in apparatus size and cost as well as an increase in inertia of a spool. Purposes of the present disclosure other than this object will be clarified by referring to the overall description disclosed herein.

A braking device of a fishing reel according to an embodiment of the present disclosure comprises: a braked part made of a conductor, the braked part being attached to a spool designed to wind a fishing line: a braking part generating braking force by providing a magnetic field for the braked part: a part being detected that is provided on the braked part; and a rotation detection sensor detecting rotation of the spool by detecting the part being detected.

In the braking device according to an embodiment of the present disclosure, the rotation detection sensor is a reflective photosensor, and the part being detected is provided on the braked part by applying two types of surface treatments with different reflection coefficients to an end face of the braked part.

In the braking device according to an embodiment of the present disclosure, the rotation detection sensor is a transmissive photosensor, and the part being detected is provided on the braked part by putting alternately a light blocking portion and a light transmission portion on the braked part.

In the braking device according to an embodiment of the present disclosure, the rotation detection sensor is a capacitive proximity sensor, and the part being detected is provided on the braked part by forming a depression and a projection on a surface of the braked part facing the rotation detection sensor.

In the braking device according to an embodiment of the present disclosure, the braking part comprises two cylindrical magnets opposite to each other in a radial direction of the braking part, and the rotation detection sensor is disposed between the two cylindrical magnets in the radial direction of the braking part.

The braking device according to an embodiment of the present disclosure is designed to adjust braking force by shifting at least one of the two cylindrical magnets by a motor.

A fishing reel according to an embodiment of the present disclosure comprises any one of the braking devices described above.

According to the embodiment above, it is possible to provide a braking device that integrates a member used to generate braking force with means being detected that is used to detect rotation of the spool and provide a fishing reel comprising such a braking device to avoid an increase in apparatus size and cost as well as an increase in inertia of a spool.

DETAILED DESCRIPTION

An embodiment of a braking device and a fishing reel comprising the braking device according to the present disclosure will now be described in detail with reference to the accompanying drawings. Components common among multiple drawings are denoted by the same reference signs in the multiple drawings. It should be noted that for the convenience of description, the drawings are not always shown in a precise aspect ratio.

With reference to FIGS. 1 to 4, a fishing reel according to an embodiment of the present disclosure and a braking device included in the fishing reel will be described. Illustration and description of some known functions of a fishing reel 1 are omitted for the simplicity of description.

Figure 1:
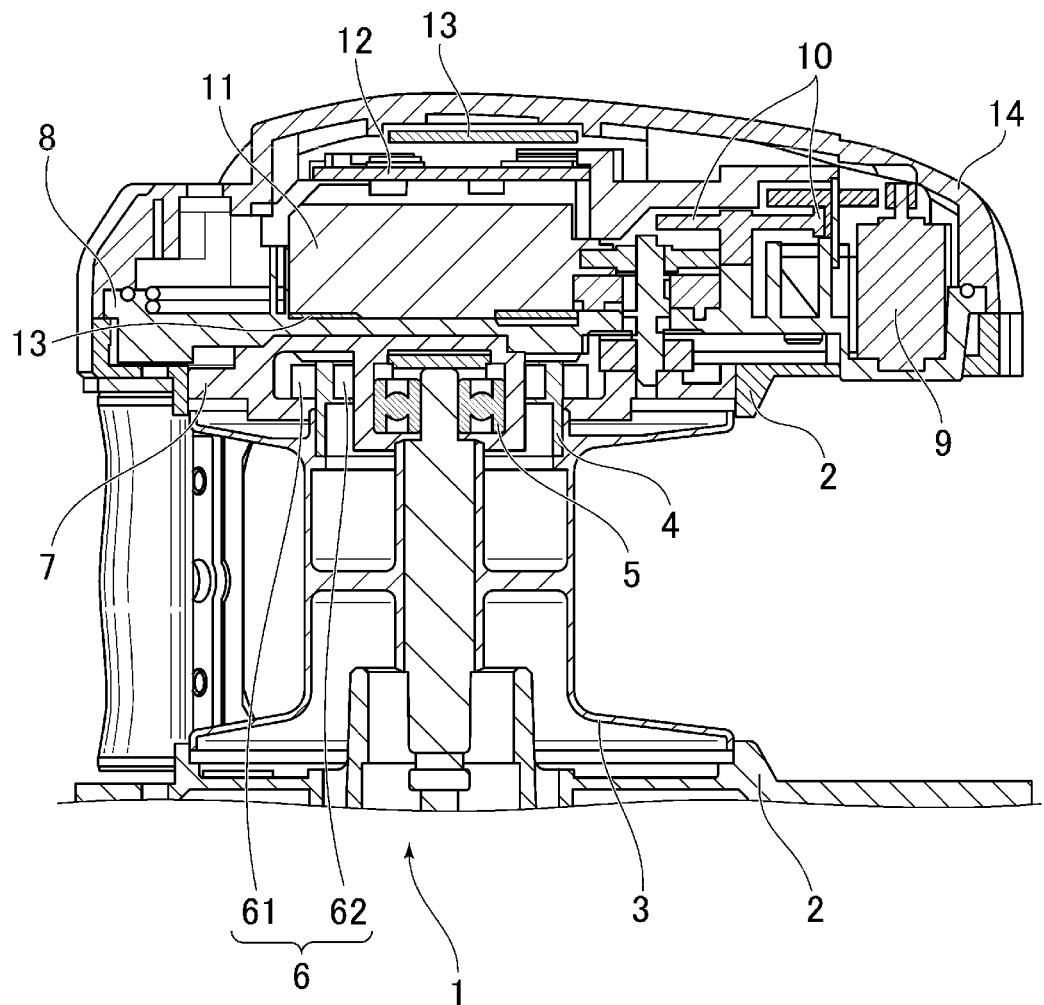
FIG. 1 is a drawing illustrating a fishing reel according to an embodiment of the present disclosure.

FIG. 1 is a cross-sectional view of the fishing reel 1, showing a cross section taken along a central axis of a reduction gear train described later. Illustration and description of some known functions of a fishing reel 1 are omitted for the simplicity of description.

As shown in FIG. 1, the fishing reel 1 according to an embodiment of the present disclosure comprises a frame (main reel body) 2, a spool 3, a braked part (induction rotor) 4, a bearing 5, a braking part (braking means) 6, a set plate 7, a lock member (not shown), an inner lid 8, a motor 9, a deceleration mechanism (reduction gear train) 10, a battery 11, a substrate 12, a detector (a rotation detection sensor) 13 described later, and an outer lid 14. However, elements other than these components may be included.

The frame (main reel body) 2 is made so as to be attachable to a fishing rod (not shown). The fishing reel 1 according to an embodiment of the present disclosure, in a similar way to the conventional fishing reel, has an operating part or operating means (not shown, e.g., a handle) that allows the spool 3 to be rotated in a forward direction by a user's operation to retrieve a fishing line. A rotating force caused by the operating part or operating means (hereinafter referred to as the operating part) is transmitted to the spool 3 through transmission means such as a gear (not shown).

The fishing reel 1 according to an embodiment of the present disclosure has a clutch part (or clutch means, not shown). By operating the clutch part (or clutch mean), the user is able to select whether a clutch for power transmission engages with or disengages from the spool 3. When the clutch for power transmission is engaged with the spool 3, the fishing line can be retrieved by the operating part. On the other hand, when the clutch for power transmission is disengaged from the spool 3, the spool is allowed to freely rotate in forward and reverse directions and the fishing line can be released.

The fishing reel 1 according to an embodiment of the present disclosure may comprise a drag part or drag means (not shown) to allow the spool 3 to run at idle in the event of torque of a predetermined level or higher and thereby prevent the fishing line from being broken or may comprise a counter rotation preventive part or counter rotation preventive means (not shown) to prevent the operating part from counter rotating. Moreover, an oscillator device (not shown) may be provided to evenly retrieve the fishing line by allowing a position of a fishing line guiding part that guides the fishing line to reciprocate in response to the rotation of the spool 3.

The spool 3 is supported by the main reel body 2 so as to be rotatable relative to the main reel body 2. The spool 3 rotates in the forward direction and thereby makes it possible to retrieve and wind the fishing line on an outer peripheral area of the spool 3. On the other hand, a lure or something similar is cast when the spool 3 rotates in the reverse direction and makes it possible to release the wound fishing line. At this time, if an amount of the released fishing line is much larger than an amount of travel of the lure or the like, line entanglement called a backlash can occur due to an excessive portion of the fishing line, preventing proper use of the fishing reel 1 in some cases. Hence, appropriate braking force is applied to the spool 3 by the braking part 6 described later to prevent such a backlash.

The set plate 7 can be fixed to the frame 2. The fishing reel 1 according to an embodiment of the present disclosure has a bayonet structure in which a plurality of locking tabs provided on the lock member (not shown) are turned and are thereby locked into a holder (not shown) provided in the frame 2. Although this structure allows the spool 3 and the set plate 7 to be detachably attached to the frame 2, the set plate 7 may be fixed by a method such as screws or bonding.

When the set plate 7 is fixed to the frame 2, the spool 3 is axially supported by the frame 2 so as to be rotatable relative to the frame 2. A stationary magnet 62 and a moving magnet (rotating magnet) 61 that are held by the set plate 7 constitute a braking part described later. The set plate 7, the inner lid 8, and the outer lid 14 constitute a side plate unit. A watertight room is defined by the inner lid 8 and the outer lid 14 and accommodates electrical components such as the substrate 12, the battery 11, the motor 9, and a sensor (not shown) inside.

The braked part (induction rotor) 4, which is made of a non-magnetic conductor such as aluminum or copper and has an annular rotating body shape, is attached to the spool 3. The rotating magnet 61, which is cylindrical in shape, is disposed on an outer periphery side of the braked part (induction rotor) 4. The stationary magnet 62, which is cylindrical in shape, is disposed on an inner periphery side of the braked part (induction rotor) 4.

An outer periphery area of the stationary magnet 62 is divided into N portions that are magnetized with alternate N poles and S poles. An inner periphery area of the rotating magnet 61 is divided into N portions that are magnetized with alternate N poles and S poles. A magnetic field generated by the stationary magnet 62 and the rotating magnet 61 passes through the braked part (induction rotor) 4 positioned between the stationary and rotating magnets. When the spool 3 is rotating, an eddy current is generated in the braked part (induction rotor) 4, causing braking torque to work in response to rotation speed of the spool. Magnitude of the braking torque is proportional to intensity of the magnetic field and the rotation speed.

As a result of this, braking force can be applied to the spool 3 when a lure or something similar is cast. This suppresses the occurrence of line slack during casting and thereby prevents the occurrence of line entanglement. A relationship between positions of the rotating magnet 61 and the stationary magnet 62 can be appropriately adjusted to adjust the magnetic field generated in the braked part (induction rotor) 4 and produce appropriate braking force. The position of the rotating magnet 61 may be designed to be adjusted by the user, for example, with a dial, or may be designed to be appropriately changed by a motor like the motor for the braking part 6 of the fishing reel 1 according to an embodiment of the present disclosure.

Next, with reference to FIGS. 2A and 2B, an example of a structure of the braking part 6 in the fishing reel 1 according to an embodiment of the present disclosure will be described. As shown in the drawings, the braking part 6 comprises a rotating magnet 61 supported by the set plate 7 (not shown) so as to be rotatable and a stationary magnet 62 fixed to the set plate 7 (not shown). The rotating magnet 61 and the stationary magnet 62 form a magnetic circuit, and a magnetic field generated by the magnetic circuit is formed so as to pass through the braked part (induction rotor) 4 made of a conductor. Thus, braking force proportional to the intensity of the magnetic field and rotation speed of the spool 3 is caused to the braked part (induction rotor) 4.

Power produced by the motor 9 is transmitted to the rotating magnet 61 through a gear or such means to enable the rotating magnet 61 to rotate. In this way, by shifting the rotating magnet 61 to a predetermined place (a shift from a state in FIG. 2A to a state in FIG. 2B by rotation of the rotating magnet 61) and adjusting the braking force applied to the braked part 4, which is fixed to the spool 3, the rotation speed of the spool 3 can be adjusted.

A fishing reel or a braking device of the fishing reel, according to an embodiment of the present disclosure, comprises: a braked part made of a conductor, the braked part being attached to a spool designed to wind a fishing line; a braking part generating braking force by providing a magnetic field for the braked part; a part being detected that is provided on the braked part; and a rotation detection sensor detecting rotation of the spool by detecting the part being detected.

With regard to the fishing reel or the braking device of the fishing reel, according to an embodiment of the present disclosure, it is possible to provide a braking device that integrates a member used to generate braking force with means being detected that is used to detect rotation of the spool and provide a fishing reel comprising such a braking device to avoid an increase in apparatus size and cost as well as an increase in inertia of a spool.

In the fishing reel or the braking device of the fishing reel, according to an embodiment of the present disclosure, the rotation detection sensor is a reflective photosensor, and the part being detected is provided on the braked part by applying two types of surface treatments with different reflection coefficients to an end face of the braked part.

In the fishing reel or the braking device of the fishing reel, according to an embodiment of the present disclosure, the rotation detection sensor is a transmissive photosensor, and the part being detected is provided on the braked part by putting alternately a light blocking portion and a light transmission portion on the braked part.

In the fishing reel or the braking device of the fishing reel, according to an embodiment of the present disclosure, the rotation detection sensor is a capacitive proximity sensor, and the part being detected is provided on the braked part by forming a depression and a projection on a surface of the braked part facing the rotation detection sensor.

Figure 2A:
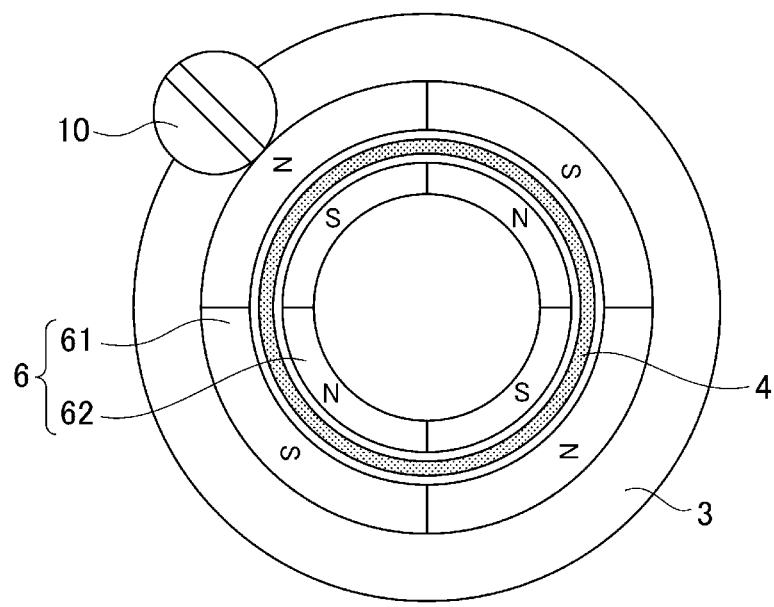
FIGS. 2A to 2B are drawings showing a configuration of a braking device according to an embodiment of the present disclosure.
Figure 2B:
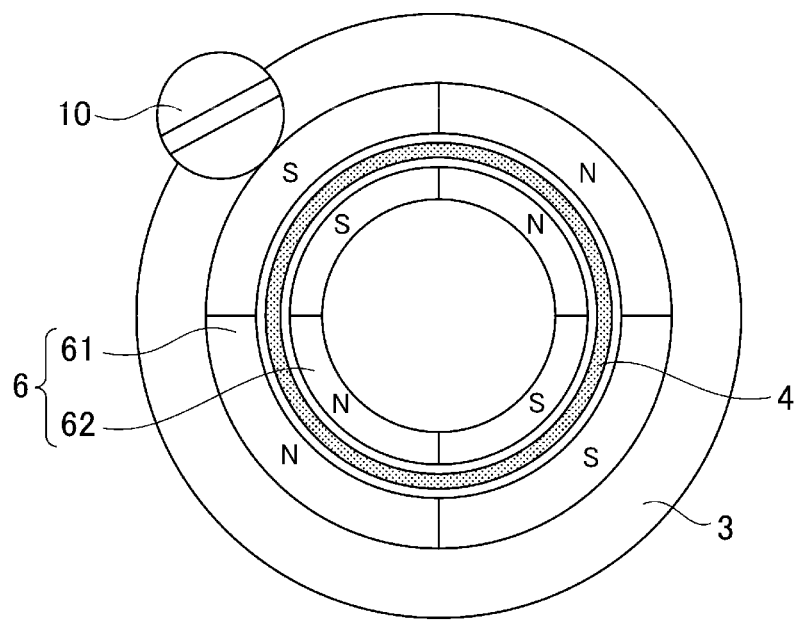

In the fishing reel or the braking device of the fishing reel, according to an embodiment of the present disclosure, the braking part comprises two cylindrical magnets opposite to each other in a radial direction of the braking part (corresponding to a radial direction of the braking device in FIGS. 2A and 2B), and the rotation detection sensor is disposed between the two cylindrical magnets in the radial direction of the braking part.

The fishing reel or the braking device of the fishing reel, according to an embodiment of the present disclosure, is designed to adjust braking force by shifting at least one of the two cylindrical magnets by a motor.

Next, a method of detecting rotation of the spool 3 will be described. The fishing reel 1 according to an embodiment of the present disclosure detects the rotation speed using a known incremental rotary encoder that outputs signals of a predetermined number of pulses whenever the spool 3 makes one revolution, but the method is not limited to this example.

Next, with reference to FIG. 3, a detector (a rotation detection sensor) in the fishing reel 1 according to an embodiment of the present disclosure will be described.

Figure 3:
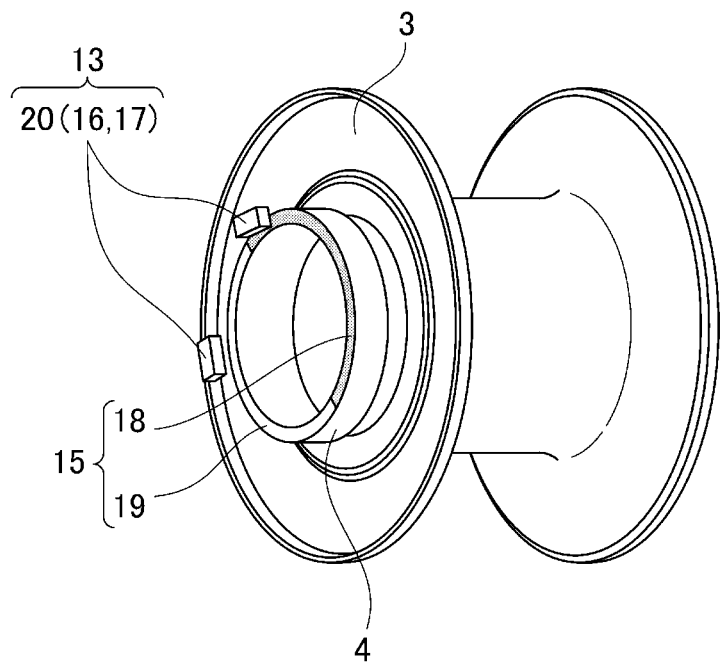
FIG. 3 is a drawing illustrating a detector (a rotation detection sensor) in a fishing reel according to an embodiment of the present disclosure.

FIG. 3 shows an example in which a reflective photosensor 20 is used as the detector (rotation detection sensor) 13. An emitter 16 and a receiver 17 of the reflective photosensor 20 are arranged side by side such that optical axes of the emitter and the receiver are substantially parallel to each other. When light is emitted from the emitter 16 to a part being detected (detected part or portion) 15 facing the rotation detection sensor (detector) 13, the reflector 17 can receive the light reflected off the part being detected 15.

In the fishing reel 1 according to an embodiment of the present disclosure, as shown in FIG. 3, the part being detected 15 is formed to have varied reflection coefficients by dividing an end face of the braked part (induction rotor) 4 into N portions and painting the divided portions of the end face in alternate bright and dark colors. A bright portion 19 is painted in a metallic surface tone or a white color. A surface of a dark portion 18 is treated so as to have a low reflection coefficient by a process such as black paining, black anodizing, black plating, and anti-reflective film covering.

With two units of the reflective photosensors 20 (emitters 16, reflectors 17) that are disposed at places facing the part being detected 15, bright or light colors of the face portions facing the respective photosensors can be detected. This allows the rotation of the spool 3 to be detected. In the fishing reel 1 according to an embodiment of the present disclosure, bright and dark portions of the part being detected 15 alternate at intervals of 180°, and the two photosensors are separated from each other by a rotation angle of 90°. With this configuration, the incremental rotary encoder outputs signals of four pulses whenever the spool 3 makes one revolution. By counting the number of pulses, a rotational movement amount of the spool 3 can be detected. By counting the number of pulses generated within a predetermined length of time, the rotation speed of the spool 3 can be detected. By detecting the rotational movement amount and the rotation speed of the spool, timing with which braking force is applied to the spool can be appropriately determined. A type, a quantity, and places of the reflective photosensors 20 and a shape, dimensions, a quantity, a method of forming, and other properties of the bright and dark portions can be thought in a variety of ways and are not limited to any specific style.

Figure 4:
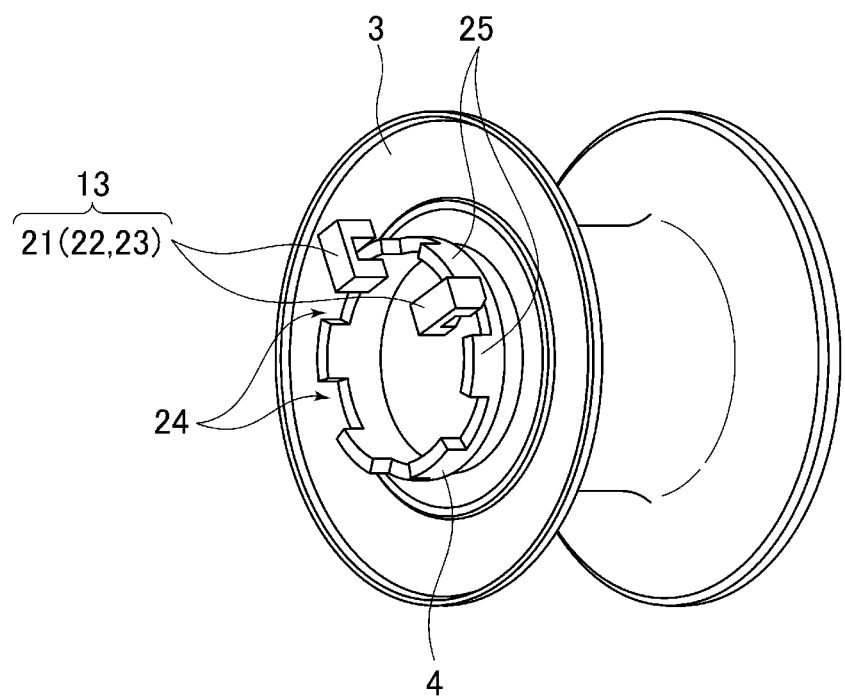
FIG. 4 is a drawing illustrating a detector (a rotation detection sensor) in a fishing reel according to an embodiment of the present disclosure.

The method of detecting spool rotation in the fishing reel 1 according to an embodiment of the present disclosure is not limited to the method described above. FIG. 4 shows an example in which a transmissive photosensor 21 is used as the detector (rotation detection sensor) 13. An emitter 22 and a receiver 23 of the transmissive photosensor 21 are arranged opposite to each other such that optical axes of the emitter and the receiver are substantially match each other. The photosensor is able to detect presence or absence of a light-blocking object passing between the emitter 22 and the receiver 23.

In the fishing reel 1 according to an embodiment of the present disclosure, the braked part (induction rotor) 4 is divided into N portions in a direction of rotation, with the divided portions having alternate slits and non-slits. A slit portion 24 allows transmission of light emitted from the emitter 22, whereas a non-slit portion (a place where no slit is formed) 25 blocks light emitted from the emitter 22.

The braked part (induction rotor) 4 is disposed between the emitter 22 and the receiver 23 of the transmissive photosensor 21, and thus whether or not the slit portion 24 is present between the emitter and receiver of the transmissive photosensor 21 can be detected. This allows the rotation of the spool to be detected. In the fishing reel 1 according to an embodiment of the present disclosure, the slit portions are arranged at intervals of 60°, and the two photosensors are separated from each other by a rotation angle of 30°. With this configuration, the incremental rotary encoder outputs signals of 12 pulses whenever the spool makes one revolution. This makes it possible to achieve effects similar to those in the case of FIG. 3. A type, a quantity, and places of the transmissive photosensors 21 and a shape, dimensions, a quantity, and other properties of the slits can be thought in a variety of ways and are not limited to any specific style.

Figure 5:
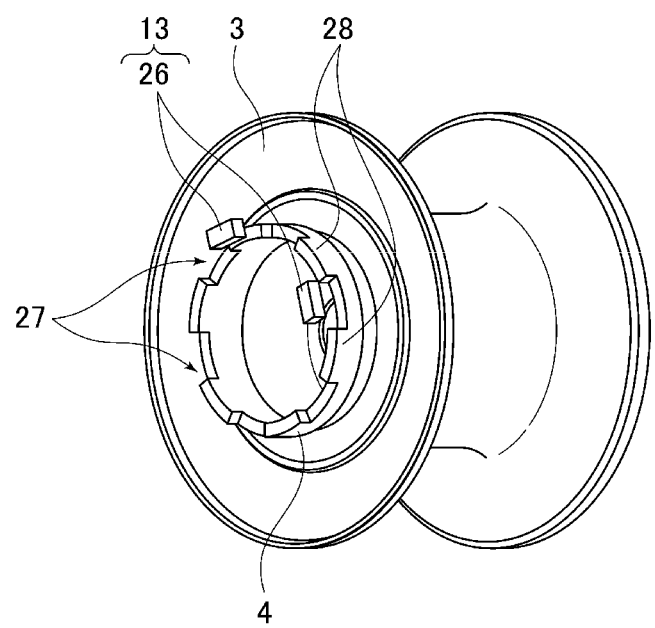
FIG. 5 is a drawing illustrating a detector (a rotation detection sensor) in a fishing reel according to an embodiment of the present disclosure.

Next, FIG. 5 shows an example in which a capacitive proximity sensor 26 is used as the detector (rotation detection sensor) 13. The capacitive proximity sensor 26 is able to detect proximity of an object by detecting a change in static capacitance caused by ingress of the object into an electric field. In the fishing reel 1 according to an embodiment of the present disclosure, the braked part (induction rotor) 4 is divided into N portions in a direction of rotation, with the divided portions having alternate slits and non-slits. When a slit portion 27 faces the capacitive proximity sensor 26, a satisfactory space is made between the capacitive proximity sensor 26 and the braked part (induction rotor) 4. This enables the capacitive proximity sensor 26 to detect the slit portion (a state in which the braked part (induction rotor) 4 is not in proximity to the sensor).

On the other hand, when a non-slit portion 28 (a place without a slit) comes to a spot facing the capacitive proximity sensor 26, the braked part (induction rotor) 4 enters into an electric field produced by the capacitive proximity sensor 26. Thus, the sensor is able to detect a resultant change in static capacity and thereby detect a state in which the braked part (induction rotor) 4 is in proximity to the sensor). This configuration allows the rotation of the spool to be detected.

In the fishing reel 1 according to an embodiment of the present disclosure, the slit portions are arranged at intervals of 60°, and the two capacitive proximity sensors 26 are separated from each other by a rotation angle of 30°. With this configuration, the incremental rotary encoder outputs signals of 12 pulses whenever the spool makes one revolution. This makes it possible to achieve effects similar to those in the case of FIG. 3. A type, a quantity, and places of the capacitive proximity sensors 26 and a shape, dimensions, a quantity, and other properties of the slits can be thought in a variety of ways and are not limited to any specific style.

As described above, the fishing reel 1 according to an embodiment of the present disclosure enables the braked part to serve both a role as a member that relays appropriate braking force cause by the braking part to the spool and a role as means being detected that is used to detect rotation of the spool. This eliminates the need for providing a separate means being detected (separate detected means). This allows the fishing reel to appropriately and efficiently avoid an increase in size and cost as well as an increase in inertia of the spool.

Avoiding an increase in inertia of the spool makes it possible to gain advantages such as increased distance over which a lure or something similar is cast and improved operability with which a lightweight lure is cast. Since the single component serves both as a means being detected (detected means) and a braked part, one type of the induction rotor can be used in common regardless of a type of the spool when a plurality of replaceable spools of different diameters are used. This provides improved compatibility.

In the fishing reel 1 according to an embodiment of the present disclosure, the end face of the braked part is a part being detected by the rotation detection sensor. This allows the rotation detection sensor (photosensor) to be disposed between the magnets in a radial direction of the braking part. This allows the substrate and the rotation detection sensor to be disposed close to each other and hence facilitates the application of a waterproof treatment. A component used to generate braking force and another component used to detect rotation of the spool can be disposed on the same side of the spool. This facilitates unitization of the braking device. In particular, if a mechanism is employed to drive the rotating magnet by a motor, a noticeable effect is produced in terms of facilitation of waterproof treatment application and unitization of the braking device. In the fishing reel 1 according to an embodiment of the present disclosure, the part being detected by the rotation detection sensor can be disposed between the rotating magnet and the stationary magnet. This allows the braked part to be made smaller in diameter than the rotating magnet. This, even in a condition in which the spool diameter is small and there is little space on the outer diameter side of the rotating magnet, allows the part being detected by the rotation detection sensor to be disposed on the same side as the braking part (braking means). In the fishing reel 1 according to an embodiment of the present disclosure, a photosensor or a capacitive proximity sensor can be used as the detector. Any of these sensors, unlike a case in which a magnetic sensor is used as the detector, are not influenced by the magnetic field of the braking part and thus are able to stably detect rotation.

The dimensions, materials, and arrangement of components described in the present specification are not limited to those explicitly described in the embodiment. The components can have any modified dimensions, materials, and arrangement that are included within the scope of the present disclosure. A component that is not explicitly described in the present specification can be added to the described embodiment, and some of the components described in the embodiment can be omitted.

REFERENCE SIGNS LIST 1 fishing reel
2 frame (main reel body)
3 spool
4 braked part (braked means)
5 bearing
6 braking part (braking means)
7 set plate
8 inner lid
9 motor
10 deceleration mechanism (reduction gear train)
11 battery
12 control substrate
13 detector (rotation detection sensor)
14 cover opposite to operating part (opposite cover)
20 reflective photosensor
21 transmissive photosensor
22 emitter
23 receiver
24 slit portion
25 non-slit portion
26 capacitive proximity sensor
27 slit portion
28 non-slit portion
61 rotating magnet
62 stationary magnet

What is claimed is:

1. A braking device of a fishing reel, comprising:
   a braked part made of a conductor, the braked part being attached to a spool configured to wind a fishing line;
   a braking part configured to generate braking force by providing a magnetic field for the braked part;
   a part being detected that is provided on the braked part; and
   a rotation detection sensor configured to detect rotation of the spool by detecting the part being detected, wherein
   the braking part comprises two cylindrical magnets opposite to each other in a radial direction of the braking part, and
   the rotation detection sensor is disposed between the two cylindrical magnets in the radial direction of the braking part.

2. The braking device of a fishing reel, according to claim 1, wherein the rotation detection sensor is a reflective photosensor, and the part being detected is provided on the braked part by applying two types of surface treatments with different reflection coefficients to an end face of the braked part.

3. The braking device of a fishing reel, according to claim 1, wherein the rotation detection sensor is a transmissive photosensor, and the part being detected is provided on the braked part by putting alternately a light blocking portion and a light transmission portion on the braked part.

4. The braking device of a fishing reel, according to claim 1, wherein the rotation detection sensor is a capacitive proximity sensor, and the part being detected is provided on the braked part by forming a depression and a projection on a surface of the braked part facing the rotation detection sensor.

5. The braking device of a fishing reel, according to claim 1, wherein the braking part is designed to adjust braking force by shifting at least one of the two cylindrical magnets by a motor.

6. A fishing reel comprising the braking device according to claim 1.

* * * * *